United States Patent
Hori et al.

(10) Patent No.: US 6,860,366 B2
(45) Date of Patent: Mar. 1, 2005

(54) OIL PASSAGE STRUCTURE IN ROTARY SHAFT

(75) Inventors: Yoshiaki Hori, Saitama (JP); Tohru Nishi, Saitama (JP); Hideyuki Tawara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 143 days.

(21) Appl. No.: 10/287,593

(22) Filed: Nov. 5, 2002

(65) Prior Publication Data

US 2003/0121724 A1 Jul. 3, 2003

(30) Foreign Application Priority Data

Nov. 8, 2001  (JP) ........................................ 2001-342918

(51) Int. Cl.[7] .............................................. F16N 11/10
(52) U.S. Cl. ...................................... 184/52; 184/105.3
(58) Field of Search .......................... 184/52, 6, 105.3, 184/7.1; 192/113.3, 113.5, 85 AA (56) References Cited

U.S. PATENT DOCUMENTS 4,842,494 A * 6/1989 Speiser ........................ 417/364
5,435,697 A * 7/1995 Guebeli et al. ................ 417/53
5,632,606 A * 5/1997 Jacobsen et al. ............. 417/415
6,035,989 A * 3/2000 Matsuoka ............... 192/85 AA

* cited by examiner

Primary Examiner—David M. Fenstermacher
(74) Attorney, Agent, or Firm—Birch, Stewart, Kolasch & Birch, LLP (57) ABSTRACT

In an oil passage structure in a rotary shaft, including two systems of oil passages different in pressure that are provided extending from both ends of the shaft, the rotary shaft is provided with oil supply holes in the radial direction of the shaft for connection between a center hole in the shaft and locations to be supplied with oil. The oil supply holes are bored from the outside of the shaft. At this time, burrs are generated at end portions of the oil supply holes on the side fronting on the center hole. Where the depth of the shaft center hole is a dead end, removal of the burrs is not easy. The shaft center hole is used as an oil passage wherein burrs, if any, in the hole can be easily removed. The two oil passages are in communication with each other through a communication passage smaller than the oil passages in diameter. The smaller-diameter communication passage is closed by pressing a steel ball therein, thereby making both of the oil passages independent from each other.

19 Claims, 8 Drawing Sheets

OIL PASSAGE STRUCTURE IN ROTARY SHAFT

CROSS-REFERENCE TO RELATED APPLICATIONS

The present nonprovisional application claims priority under 35 USC 119 to Japanese Patent Application No. 2001-342918 filed on Nov. 8, 2001 the entire contents thereof is hereby incorporated by reference.

BACKGROUND OF THE INVENTION

1. Field of the Invention

The present invention relates to an oil passage structure in a rotary shaft that is applied to a transmission of an internal combustion engine-transmission integrated type power unit for a four-wheel buggy car (saddle ride type vehicle for operating on wasteland).

2. Description of Background Art

There has hitherto been practiced a technology in which center holes extending along the center line of a rotary shaft are provided that extend from both ends of the rotary shaft. Oil supply holes are provided for connecting the center holes with portions requiring oil supply. Oil that is different in pressure, namely, a high-pressure working oil for an oil hydraulic clutch and a low-pressure lubricating oil are supplied, respectively, from both ends of the rotary shaft. Thus, two systems of oil passages are formed. Since it is necessary to supply the oil at different pressures into the center holes, the depths of the center holes bored from both ends of the shaft have hitherto been so set that the center holes are not in communication with each other in the shaft in the boring step. Therefore, the center holes have been partitioned from each other by the material of the shaft itself. Namely, the depth bottom portions of the center holes have each been machined into a dead end shape.

Oil supply holes extending in the radial direction of the rotary shaft for connecting the center holes of the shaft with portions requiring oil supply are bored in the rotary shaft from outside of the shaft. At this time, so-called burrs are generated at an end portion of each oil supply hole on the side fronting on the center hole. In the case of the center hole having the above-mentioned dead end shape, it is difficult to perform deburring, and much time has been required for the deburring step.

SUMMARY AND OBJECTS OF THE INVENTION

It is an object of the present invention to provide a structure for shaft center holes used as oil passages in which it is possible to easily remove burrs, which may be generated in the holes.

The present invention has solved the above-mentioned problem. The present invention pertains to an oil passage structure in a rotary shaft, including two systems of oil passages that are different in pressure. The oil passages are provided to extend from both ends of the shaft, wherein the two oil passages are in communication with each other through a communication passage that is smaller than the oil passages in diameter. The smaller-diameter communication passage is closed by pressing a steel ball therein.

According to the present invention as constituted above, after the machining of the center holes and radial oil supply holes and before the pressing-in of the steel ball, both the center holes are in a condition of mutually communication with each other. Thus, it is easy to remove burrs present in the center holes. In addition, by the pressing-in of the steel ball, the high-pressure oil passage and the low-pressure oil passage can be easily separated from each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
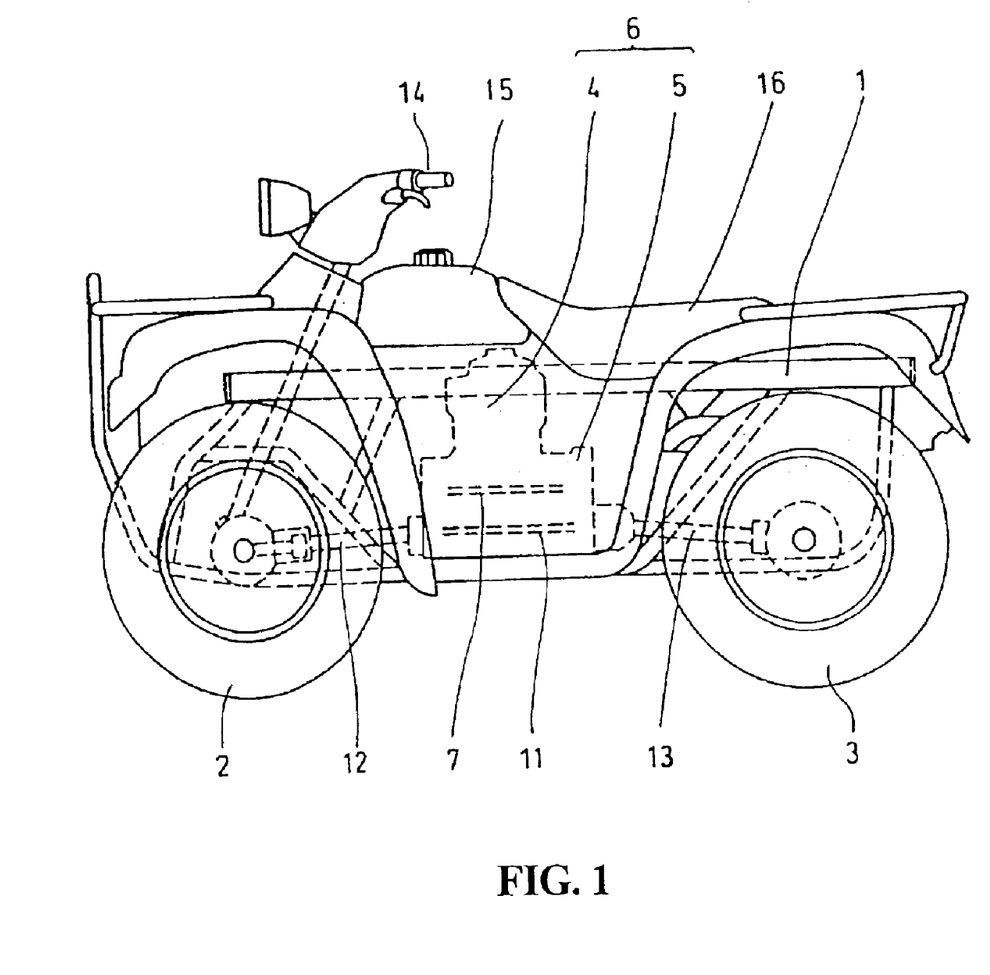
FIG. 1 is a side view of a four-wheel buggy car (saddle ride type vehicle for operating on wasteland) on which an internal combustion engine according to the present invention is mounted.

FIG. 1 is a side view of a four-wheel buggy car (saddle ride type vehicle for operating on wasteland) on which an internal combustion engine with an oil hydraulic type automatic transmission according to the present invention is mounted. The buggy car has a structure in which left-right pairs of front wheels 2 and rear wheels 3 are provided, respectively, at front and rear portions of a vehicle body frame 1, and a power unit 6 integrally constituting an internal combustion engine 4 and a transmission 5 is supported on a central portion of the vehicle body frame 1. The power unit 6 is disposed with a crankshaft 7 directed in the front-rear direction of the vehicle body. The rotation of the crankshaft 7 is transmitted through a main shaft 8, a counter shaft 9, and an intermediate shaft 10 (all shown in FIG. 4) of the transmission to an output shaft 11. These shafts are all parallel to the crankshaft, and are disposed in the front-rear direction of the vehicle body. The front wheels 2 are driven by a front wheel drive shaft 12 connected to the front end of the output shaft 11, while the rear wheels 3 are driven by a rear wheel drive shaft 13 connected to the rear end of the output shaft 11. A steering handle 14, a fuel tank 15, and a saddle type seat 16 are provided, in this order from the front side, at upper portions of the vehicle body.

Figure 2:
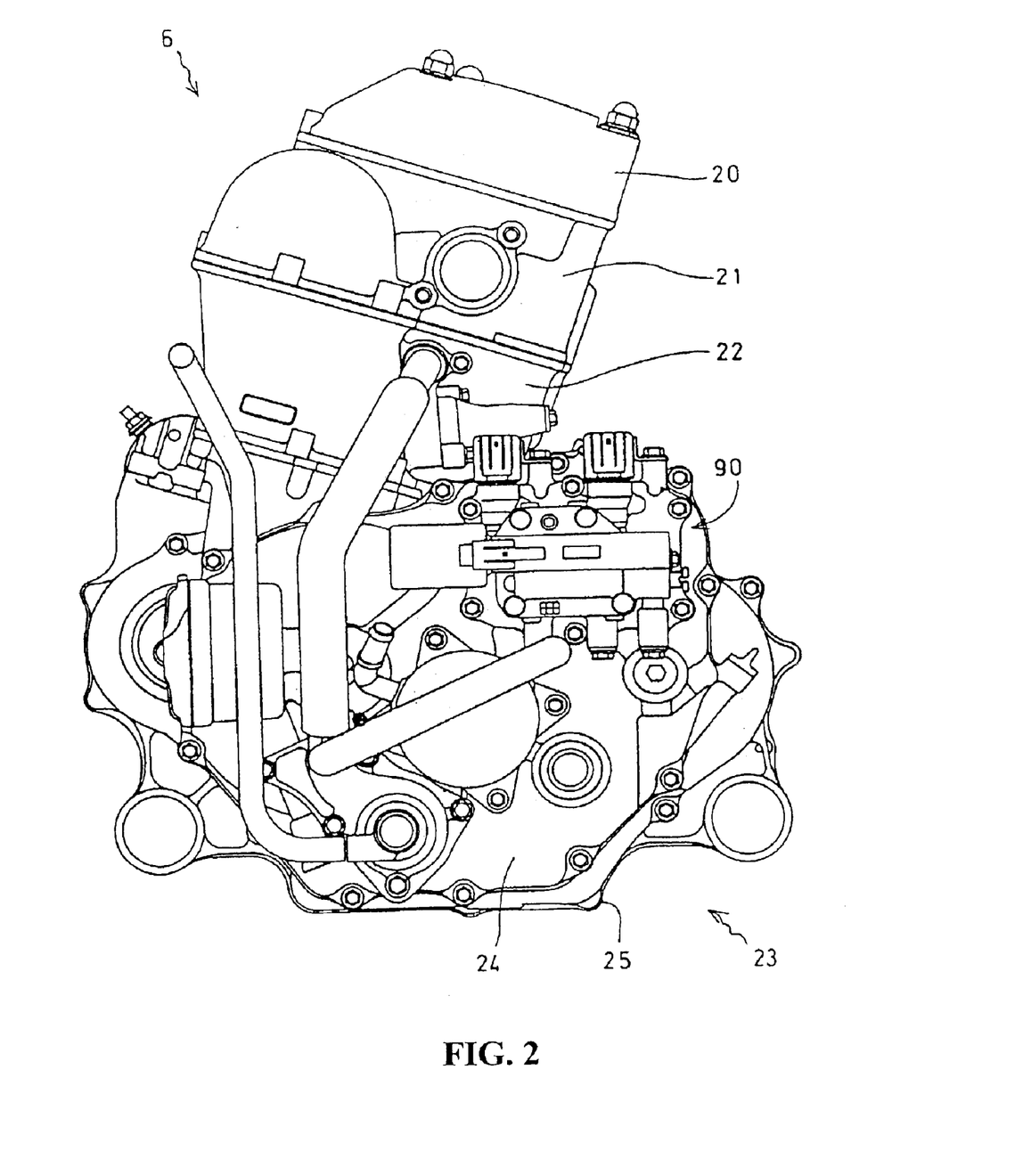
FIG. 2 is a front view of a power unit according to the present invention.
Figure 3:
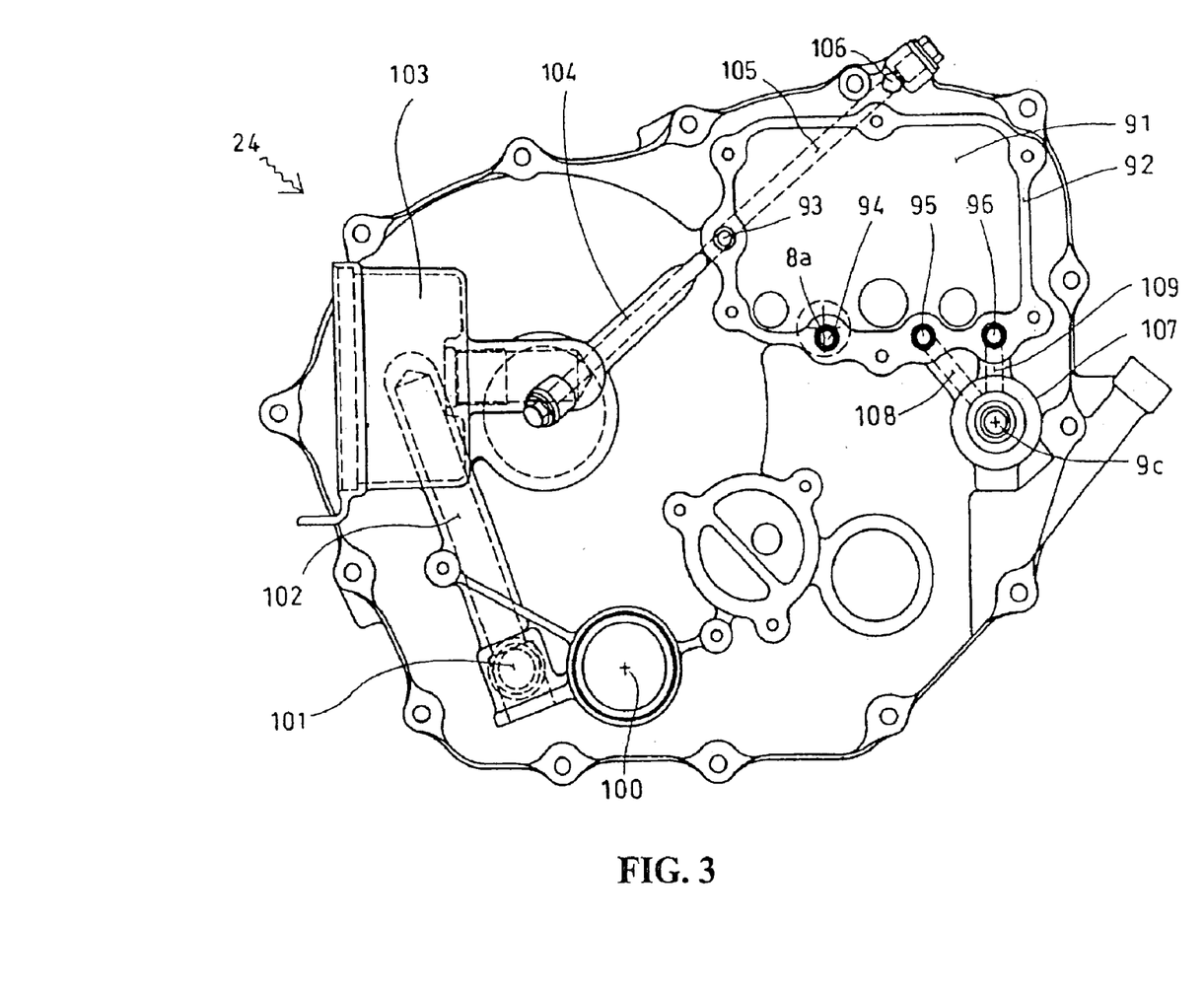
FIG. 3 is a view of a front crankcase cover from the front side.

FIG. 2 is a front view of the power unit 6 according to the present invention, in which the front surface of the power unit 6 is viewed from the front side. A main body portion of the power unit 6 is generally composed of four portions, namely, a cylinder head cover 20, a cylinder head 21, a cylinder block 22 and a crankcase 23, in this order from the upper side. In addition, the crankcase 23 is divided in a plane orthogonal to the crankshaft 7 into four portions, for forming a front crankcase cover 24, a front crankcase 25, a rear crankcase 26 and a rear crankcase cover 27 (these are partially shown in FIGS. 5, 6, and 8), in this order from the front side. In FIG. 2, the front crankcase cover 24 is illustrated and the front crankcase 25 is a somewhat illustrated a little in the surroundings thereof. Various equipment and piping are fitted to a front surface of the front crankcase cover 24. FIG. 3 is a view of only the front crankcase cover 24 from the front side, and FIG. 4 is a view of the front crankcase 25 from the front side.

Figure 4:
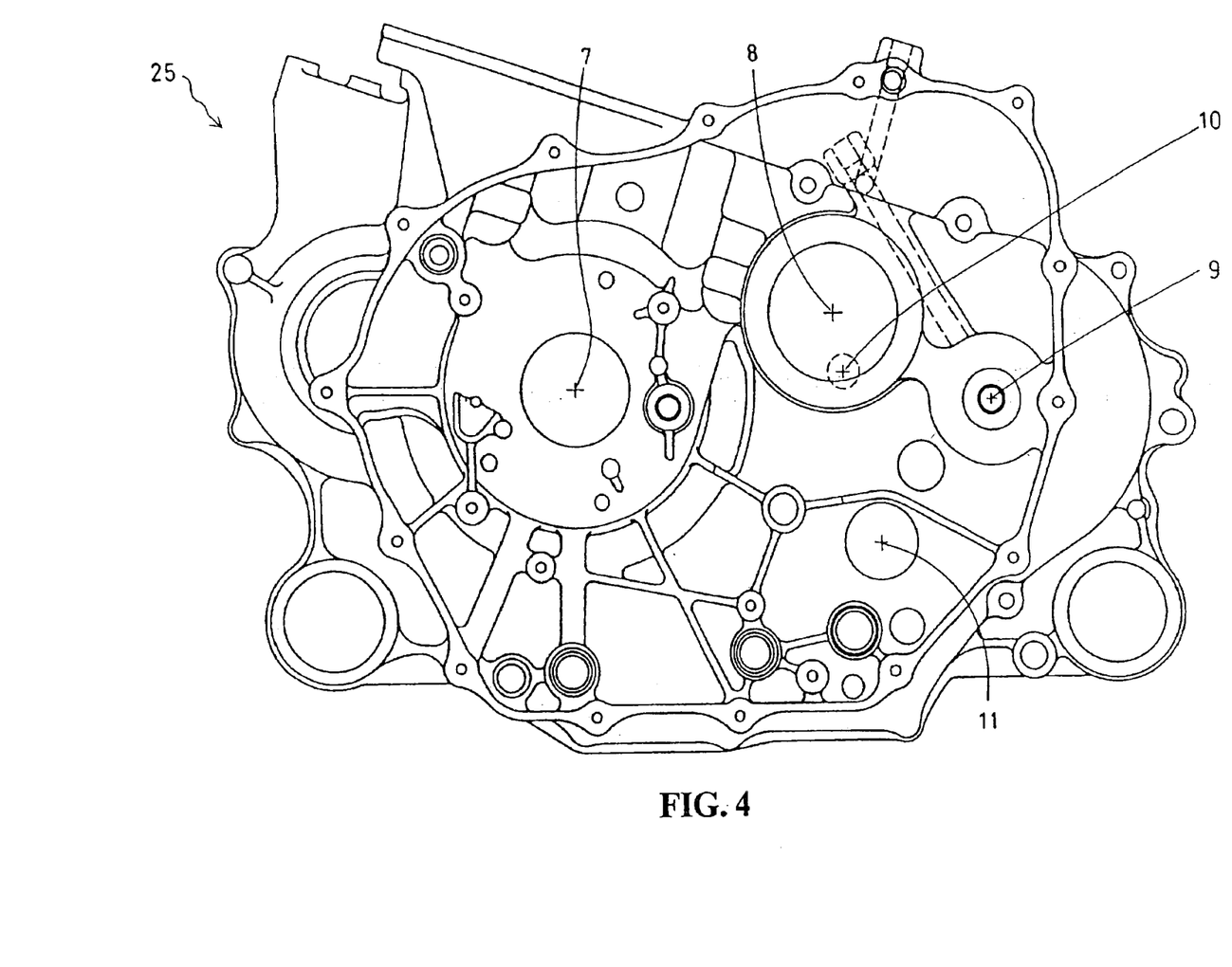
FIG. 4 is a view of a front crankcase from the front side.
Figure 5:
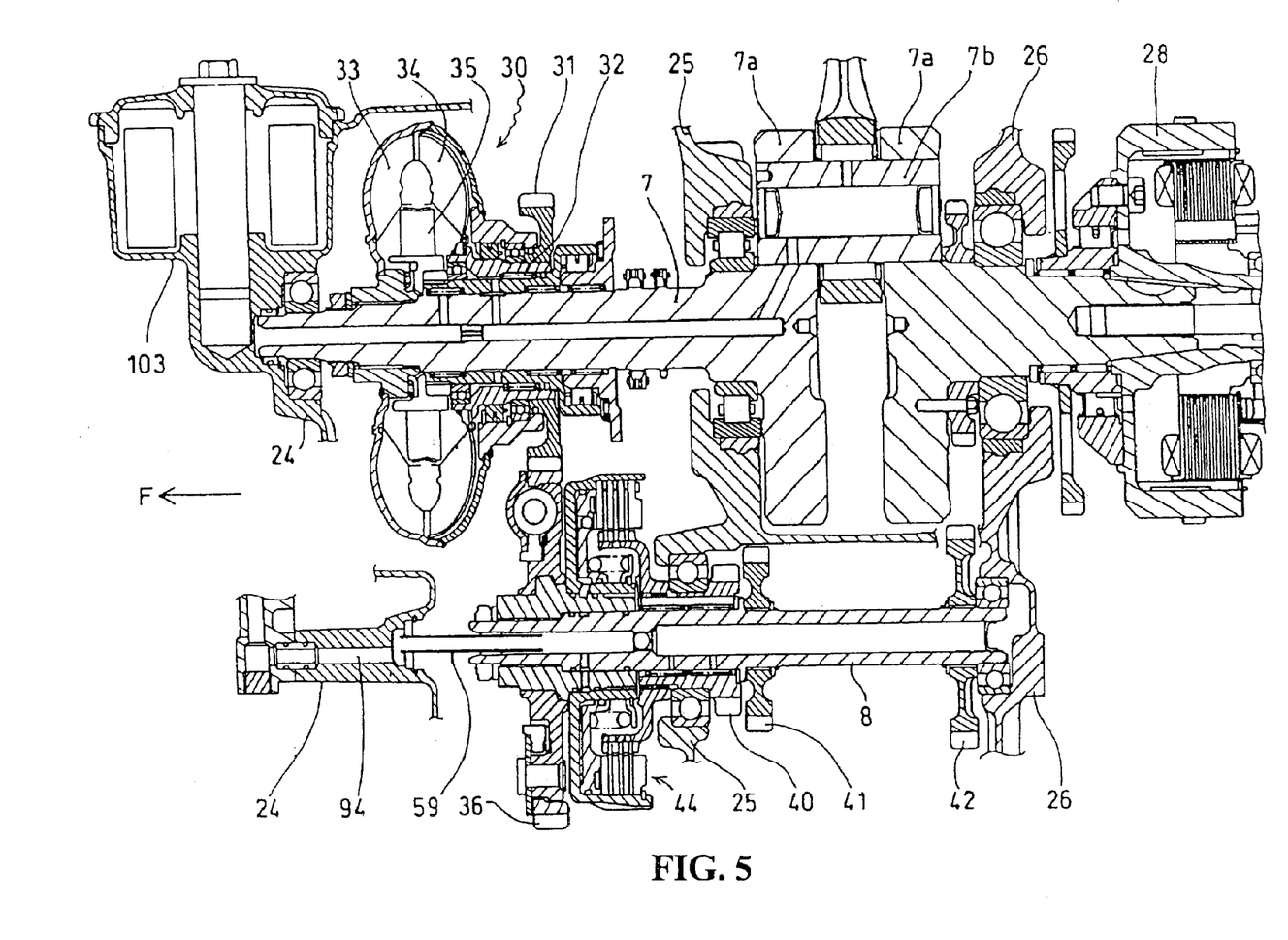
FIG. 5 is a vertical sectional view of the inside of a crankcase, showing the relationship between a crankshaft and a main shaft.
Figure 6:
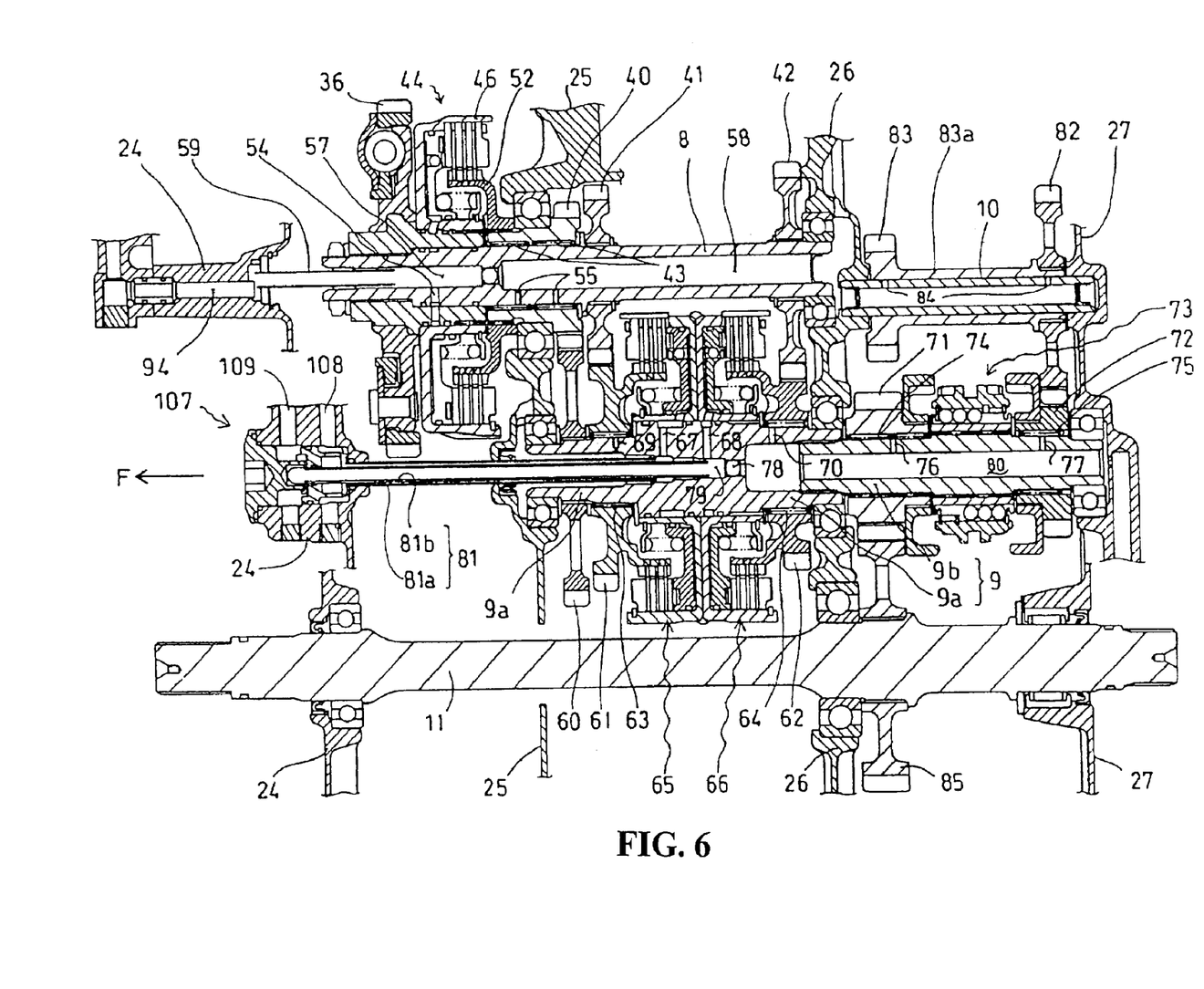
FIG. 6 is a vertical sectional view of the inside of the crankcase, showing the relationship among the main shaft, a counter shaft, an intermediate shaft, and an output shaft.
Figure 8:
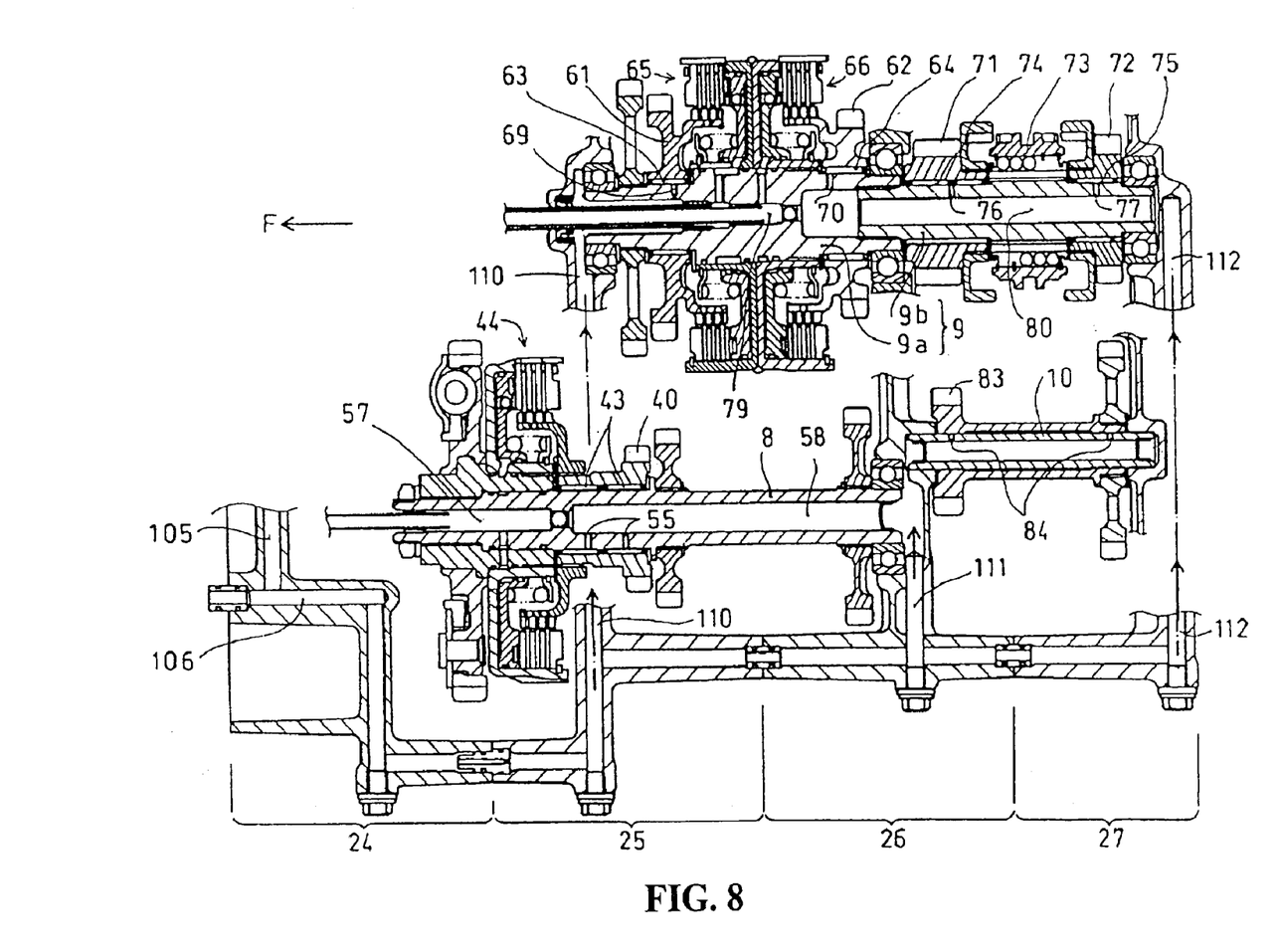
FIG. 8 is a vertical sectional view of an oil passage for supplying a lubricating oil.

FIG. 4 shows the positions of the crankshaft 7, the main shaft 8, the counter shaft 9, the intermediate shaft 10, and the output shaft 11 of the transmission. FIGS. 5, 6, and 8 are vertical sectional views of the inside of the crankcase passing through main shafts in the crankcase, in which FIG. 5 shows the relationship between the crankshaft 7 and the main shaft 8, FIG. 6 shows the relationship among the main shaft 8, the counter shaft 9, the intermediate shaft 10, and the output shaft 11, and FIG. 8 shows the relationship between the main shaft 8, the counter shaft 9, and the intermediate shaft 10, and lubricating oil supply oil passages. In these figures, arrow F indicates the front or forward direction.

FIG. 5 shows a power transmission mechanism between the crankshaft 7 and the main shaft 8. The crankshaft 7 is supported on the front and rear crankcases 25 and 26 through bearings. A front extended portion of the crankshaft 7 is supported on the front crankcase cover 24 through a bearing. The crankshaft 7 is divided into front and rear portions, which are connected by a crank pin 7b at a crank web 7a. An AC generator 28 for generating power by rotation of the crankshaft 7 is fitted to the rear end of the crankshaft 7.

The crankshaft 7 is provided with a primary driving gear 31 through a torque converter 30. The primary driving gear 31 is rotatably supported on the crankshaft 7 through a needle bearing 32. The torque converter 30 includes a pump impeller 33 fixed to the crankshaft 7, a turbine runner 34 opposed thereto, and a stator 35. The primary driving gear 31 rotatable in relation to the crankshaft 7 is connected to the turbine runner 34, and power from the crankshaft 7 is transmitted to the primary driving gear 31 through the working oil. A primary driven gear 36 constantly meshed with the primary driving gear 31 is fixed to a front end portion of the main shaft 8 of the transmission. The rotation of the crankshaft 7 is transmitted to the main shaft 8 through primary speed reduction performed by the primary driving gear 31 and the primary driven gear 36.

FIG. 6 shows a power transmission mechanism among the main shaft 8, the counter shaft 9, the intermediate shaft 10, and the output shaft 11 of the transmission. The main shaft 8 of the transmission is supported on the front and rear crankcases 25 and 26 through bearings. The main shaft 8 is provided with a first gear position driving gear 40, a second gear position driving gear 41 and a third gear position driving gear 42, which differ in the number of teeth according to speed reduction ratios. The second gear position driving gear 41 and the third gear position driving gear 42 are fixed gears, which are fixed on the main shaft 8, while the first gear position driving gear 40 is rotatably supported on the main shaft 8 through a needle bearing 43. In the description below, generally, a gear rotatably supported on a rotary shaft through a needle bearing is called a floating gear. A first gear position oil hydraulic type multiple disk clutch 44 is intermediately provided between the main shaft 8 and the first gear position driving gear 40.

Figure 7:
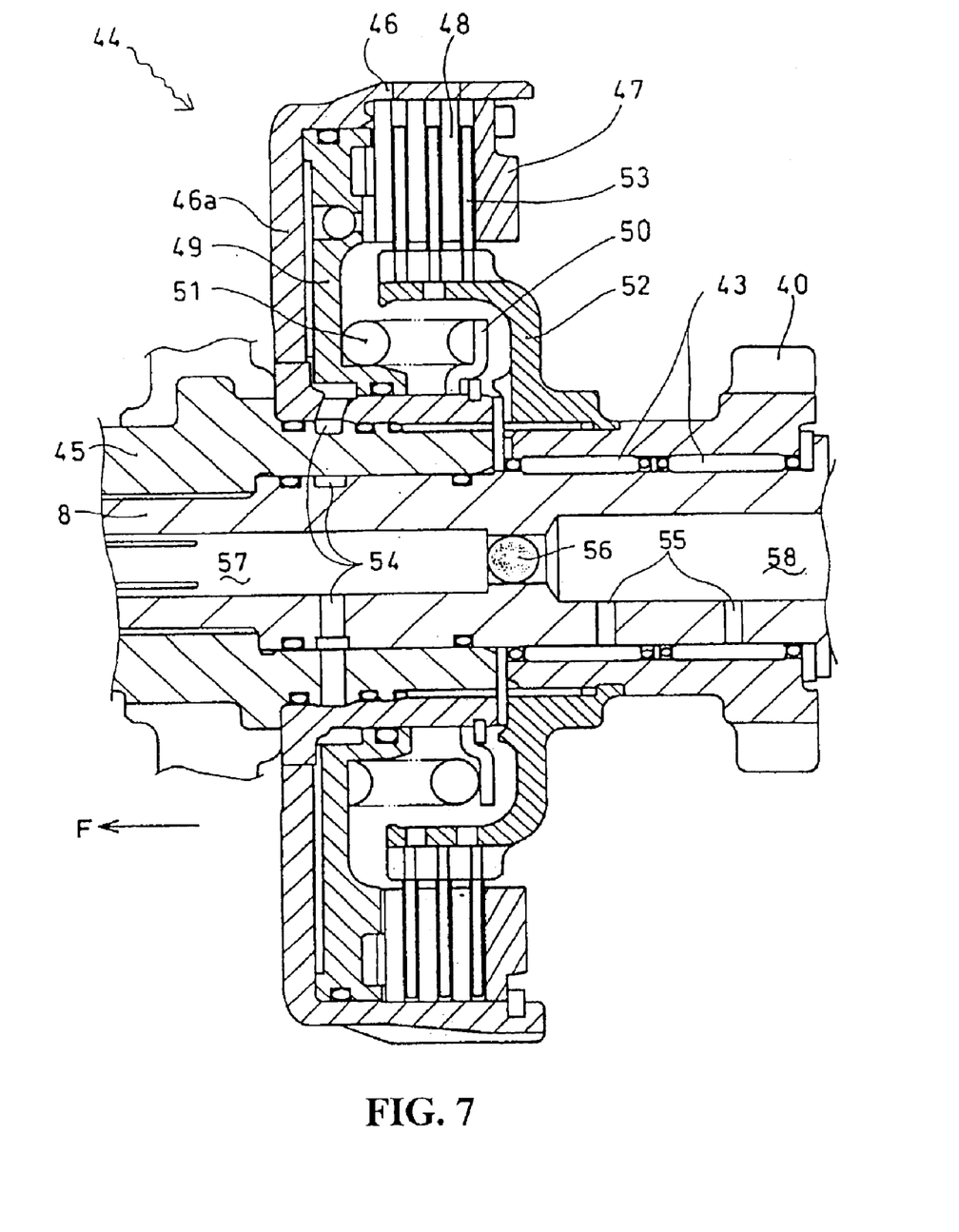
FIG. 7 is an enlarged sectional view for illustrating the constitution and actions of a first gear position oil hydraulic type multiple disk clutch and a first gear position driving gear.

FIG. 7 is an enlarged sectional view for illustrating the constitution and actions of the first gear position oil hydraulic type multiple disk clutch 44 and the first gear position driving gear 40. The first gear position oil hydraulic type multiple disk clutch 44 is composed of a vessel form clutch outer 46 fixed to the main shaft 8 through an outer cylinder 45. An annular stopper 47 is fixed to an open end of the clutch outer 46 with outside clutch disks 48 held on an inner peripheral surface of the clutch outer through splines so as to be displaceable in the axial direction. A pressure plate 49 is fitted in a piston form adjacently to a bottom wall portion 46a of the clutch outer 46 with a coil spring 51 provided between a locking portion 50 provided on the clutch outer 46 and the pressure plate 49 for pressing the pressure plate 49 towards the bottom wall portion 46a of the clutch outer 46. A clutch inner 52 is fitted integrally to the first gear position driving gear 40 with inside clutch disks 53 held on an outer peripheral surface of the clutch inner 52 through splines so as to be displaceable in the axial direction and arranged alternately with the outside clutch disks 48. A working oil supply hole 54 in the first oil hydraulic type multiple disk clutch 44 is provided so as to connect the main shaft 8, the outer cylinder 45, and the clutch outer 46 with lubricating oil supply holes 55 for the needle bearing 43 for the first gear position driving gear 40. The main shaft 8 is provided with a center hole with an inside diameter varied steppedly on the center line thereof. A steel ball 56 is press fitted in the narrowest portion of the center hole, whereby the center hole is partitioned into a front portion center hole 57 and a rear portion center hole 58.

As shown in FIG. 6, the working oil for the clutch 44 is fed from the side of the front crankcase cover 24 to the front portion center hole 57 through a working oil supply pipe 59 and is supplied to the clutch 44 through the working oil supply hole 54. As shown in FIG. 7, as the working oil comes between the bottom wall portion 46a of the clutch outer 46 and the pressure plate 49, the oil pressure causes the pressure plate 49 to move against an energizing force of the coil spring 51, the inside and outside clutch disks are pressed in the axial direction and the outside clutch disks 48 restricts the movement of the inside clutch disks 53. By this arrangement, the clutch inner 52 is integrated with the clutch outer 46, the first gear position driving gear 40 does not float but is fixed to the main shaft 8 and the rotation of the main shaft 8 is transmitted to the first gear position driving gear 40. A lubricating oil for the needle bearing 43, which bears the first gear position driving gear 40, is supplied from the side of the rear portion center hole 58 through the lubricating oil supply hole 55.

The counter shaft 9 includes a front portion counter shaft 9a and a rear portion counter shaft 9b, which are integrated with each other to form the counter shaft 9. The counter shaft 9 is supported on the front crankcase 25, the rear crankcase 26, and the rear crankcase cover 27 through bearings. The front portion counter shaft 9a is provided with a first gear position driven gear 60, a second gear position driven gear 61, and a third gear position driven gear 62, which are constantly meshed, respectively, with the first gear position driving gear 40, the second gear position driving gear 41 and the third gear position driving gear 42 on the main shaft 8. The first gear position driven gear 60 is a fixed gear fixed to a shaft, while the second gear position driven gear 61 and the third gear position driven gear 62 are floating gears, which are supported rotatably in relation to the counter shaft 9 through needle bearings 63 and 64, respectively. A second gear position oil hydraulic type multiple disk clutch 65 and a third gear position oil hydraulic type multiple disk clutch 66 are intermediately provided between the counter shaft 9 and these floating gears, respectively. In these clutches, a clutch outer is fixed to the counter shaft 9, and a clutch inner is connected to the floating gear. The constitution and actions of these clutches are the same as those of the above-mentioned first gear position oil hydraulic type multiple disk clutch 44. Therefore, a detailed description thereof is omitted. Also in these clutches, a working oil is supplied through working oil supply holes 67 and 68 formed in the counter shaft, whereby floating of the floating gears is stopped, to enable transmission of power, thereby performing a speed reduction at the second gear position or the third gear position. Lubricating oil supply holes 69 and 70 leading to the needle bearings 63 and 64 for bearing the second gear position driven gear 61 and the third gear position driven gear 62 are also formed in the counter shaft 9.

The rear portion counter shaft 9b is provided with a forward-running driving gear 71 and a backward-running driving gear 72. These are both floating gears, of which the one engaged with a manual dog clutch 73 provided at an intermediate position therebetween is fixed to a shaft, whereby transmission of power is enabled. Lubricating oil supply holes 76 and 77 for supplying a lubricating oil to needle bearings 74 and 75 respectively bearing the forward-running driving gear 71 and the backward-running driving gear 72 are formed in the rear portion counter shaft 9b.

The counter shaft 9 includes the front portion counter shaft 9a and the rear portion counter shaft 9b integrated with each other and provided with a center hole, which is partitioned into a front portion center hole 79 and a rear portion center hole 80 by a steel ball 78 press fitted in a narrowest portion thereof. The supply of a working oil to the second and third gear position oil hydraulic type multiple disk clutches 65 and 66 is conducted from the side of the front crankcase cover 24 through a double-wall pipe 81. The double-wall pipe 81 includes an outer pipe 81a and an inner pipe 81b. The working oil for the second gear position oil hydraulic type multiple disk clutch 65 is supplied through an oil passage between the outer pipe 81a and the inner pipe 81b and through the working oil supply hole 67. The working oil for the third gear position oil hydraulic type multiple disk clutch 66 is supplied through an oil passage inside the inner pipe 81b and the working oil supply hole 68. The working oil for the needle bearing 63 for the second gear position driven gear 61 is supplied from the side of the front crankcase 25 through an oil passage between the front portion counter shaft 9a and the outer pipe 81a and through the lubricating oil supply hole 69. The working oil supplied to the needle bearings 64, 74, and 75 for the third gear position driven gear 62, the forward-running driving gear 71 and the backward-running driving gear 72 is supplied from the side of the rear crankcase cover 27 through the rear portion center hole 80 of the counter shaft 9 and the lubricating oil supply holes 70, 76, and 77.

The intermediate shaft 10 is supported on the rear crankcase 26 and the rear crankcase cover 27. A first intermediate gear 82 is constantly meshed with the backward-running driving gear 72 and a second intermediate gear 83 is connected to the first intermediate gear 82 through a long sleeve portion 83a rotatably held on the intermediate shaft 10. A lubricating oil for sliding portions of the first intermediate gear 82 and the second intermediate gear 83 for sliding in relation to the intermediate shaft 10 is supplied from the rear crankcase 26 through a center hole of the intermediate shaft and a lubricating oil supply hole 84.

The output shaft 11 is supported on the front crankcase cover 24, the rear crankcase 26, and the rear crankcase cover 27 through bearings. The output shaft 11 pierces through the front crankcase 25 without making contact with the front crankcase 25. An output shaft driven gear 85 constantly meshed with the forward-running driving gear 71 and the second intermediate gear 83 is fixed onto the output shaft 11. The output shaft driven gear 85 is driven for forward operating or driven for backward operating through the gear that the dog clutch 73 is engaged, whereby the output shaft 11 is rotated in a direction suitable for forward operating or backward operating of the vehicle. Such a control is made so that the backward-running driving is connected only when the counter shaft 9 is rotating at the first gear position.

The gears in the above-mentioned transmission are all constantly meshed type gears, and which of speed change ratios is effected is determined by which of the oil hydraulic type multiple disk clutches 44, 65, and 66 is put into the connected condition. The oil pressure control for this is performed by a valve body 90 assembled as an integral oil pressure control system by collecting the solenoid valve and oil pressure changeover valves. The position of the valve body 90 is as shown in FIG. 2; namely, the valve body 90 is fitted to a front surface of the front crankcase cover 24. The valve body 90 is fitted to a fitting recessed portion 91 of the front crankcase cover 24 shown in FIG. 3, and is fixed to a fitting surface 92 in the surroundings of the fitting recessed portion 91 through a gasket. In the fitted condition, a front half of the valve body 90 is exposed to the exterior of the front crankcase cover 24, and a rear half of the valve body 90 is embedded in the fitting recessed portion 91 of the front crankcase cover 24. The fitting surface 92 of the front crankcase cover 24 is formed to be parallel with parting faces of the crankcase.

Transfer of the working oil between the front crankcase cover 24 and the valve body 90 is performed between a plurality of working oil inlet/outlet ports provided in the fitting surface 92 and a plurality of working oil inlet/outlet ports provided in the fitting surface on the side of the valve body 90 at positions opposed to the former working oil inlet/outlet ports. The gasket intermediately disposed between the fitting surfaces of the valve body 90 and the front crankcase cover 24 is provided with oil passage holes at positions corresponding to the plurality of working oil inlet/outlet ports.

FIG. 3 shows the working oil inlet/outlet ports provided in the valve body fitting surface 92 of the front crankcase cover 24. These are a working oil supply port 93 leading from the front crankcase cover 24 towards the valve body 90, a working oil inlet 94 leading from the valve body 90 towards the first gear position oil hydraulic type multiple disk clutch, a working oil inlet 95 leading from the valve body 90 towards the second gear position oil hydraulic type multiple disk clutch, and a working oil inlet 96 leading from the valve body 90 towards the third gear position oil hydraulic type multiple disk clutch.

In FIG. 3, an extension position 100 of a pump shaft centerline is illustrated for an oil pump, which is not shown. The oil pump is provided between the front crankcase cover 24 and the front crankcase 25. Oil fed from the oil pump is fed to an oil filter 103 through oil passages 101 and 102 formed in the inside of a wall surface of the front crankcase cover 24. After foreign matter is filtered away from the oil by the filter, the oil is fed out through an oil passage 104, and a portion of the oil is fed through the working oil supply port 93 into the valve body 90. The other portion of the oil is fed out through an oil passage 105 and an oil passage 106 extending orthogonally to the oil passage 105 towards the front crankcase 25, as a working oil for the torque converter or as a lubricating oil for bearing portions.

In FIG. 3, an extension position 8a of the center line of the main shaft 8 of the transmission is illustrated. The working oil fed out to the working oil inlet 94 leading from the valve body 90 towards the first gear position oil hydraulic type multiple disk clutch 44 is fed to the front portion center hole 57 of the main shaft 8 through the working oil supply pipe 59 provided bridgingly from a rear surface of the front crankcase cover 24 to the front portion center hole 57, as shown in FIG. 6, and is supplied to the first gear position oil hydraulic type multiple disk clutch 44.

In FIG. 3, an extension position 9c of the center line of the counter shaft 9 is illustrated. This portion of the front crankcase cover 24 is provided with an oil passage connection portion 107, and oil passages 108 and 109 are formed that lead, respectively, from the working oil inlet 95 leading towards the second gear position oil hydraulic type multiple disk clutch 65 and the working oil inlet 96 leading towards the third gear position oil hydraulic type multiple disk clutch 66 to the oil passage connection portion 107. The working oil fed from the valve body 90 to the working oil inlet 95 or the working oil inlet 96 is fed from the oil passage connection portion 107 to the front portion center hole 79 of the counter shaft 9 through either of the inner and outer passages of the working oil supply double-wall pipe 81 provided bridgingly to the front portion center hole 79, as shown in FIG. 6, and is supplied to the second gear position oil hydraulic type multiple disk clutch 65 or the third gear position oil hydraulic type multiple disk clutch 66.

FIG. 8 is a vertical sectional view of an oil passage for supplying the lubricating oil, which follows the oil passages 105 and 106 shown in FIG. 3. The oil passage for supplying the lubricating oil has a structure in which oil passages bored in the surrounding portions of four portions of the crankcase, namely, the front crankcase cover 24, the front crankcase 25, the rear crankcase 26, and the rear crankcase cover 27 are in communication with each other. As has been described above, the working oil for the clutches is all supplied directly from the front crankcase cover 24; while, on the other hand, the lubricating oil for bearing portions of the speed change gears is supplied from the oil passages in the front crankcase 25, the rear crankcase 26, and the rear crankcase cover 27.

An oil passage 110 bored in the front crankcase 25 is an oil passage for supplying the lubricating oil to the needle bearing 63 for the second gear position driven gear 61 on the counter shaft 9 through the lubricating oil supply hole 69. An oil passage 111 bored in the rear crankcase 26 is an oil passage for supplying the lubricating oil to the needle bearing 43 for the first gear position driving gear 40 on the main shaft 8 through the lubricating oil supply hole 55, and for supplying the lubricating oil to a sliding portion for a shaft of the second intermediate gear 83 on the intermediate shaft 10 through the lubricating oil supply hole 84. An oil passage 112 bored in the rear crankcase cover 27 is an oil passage for supplying the lubricating oil to the needle bearing 64 for the third driven gear 62 on the counter shaft 9 through the lubricating oil supply hole 70, for supplying the lubricating oil to the needle bearing 74 for the forward-running driving gear 71 through the lubricating oil supply hole 76, and for supplying the lubricating oil to the needle bearing 75 for the backward-running driving gear 72 through the lubricating oil supply hole 77.

As has been detailed above, in the present embodiment, the main shaft 8 is provided with the center hole steppedly varied in inside diameter on the center line thereof, and the steel ball 56 is pressed into the narrowest portion of the center hole, whereby the center hole is partitioned into the front portion center hole 57 and the rear portion center hole 58. The counter shaft 9 is provided with the center hole on the center line thereof, and the steel ball 78 pressed into the narrowest portion of the center hole partitions the center hole into the front portion center hole 79 and the rear portion center hole 80. Therefore, after the machining or boring of the center holes and the radial oil supply holes and before the steel balls are pressed in, the center holes bored from both ends of the shaft are in communication with each other. Accordingly, removal of the burrs present in the center holes can be performed easily and sufficiently, and inconveniences such that the burrs are separated during the use of the power unit to flow out into the oil pressure system with the result of producing a clogging of an orifice or the like can be obviated.

In addition, in the present embodiment, the high-pressure working oil flowing toward the clutch 44 on the main shaft 8 is supplied by being fed from the side of the front crankcase cover 24 to the front portion center hole 57 through the working oil supply pipe 59. The low-pressure lubricating oil flowing toward the needle bearing 43, which bears the first gear position driving gear 40, is supplied from the side of the rear portion center hole 58. The high-pressure working oil supplied towards the second and third gear position oil hydraulic type multiple disk clutches 65 and 66 on the counter shaft 9 is supplied from the side of the front crankcase cover 24 through the double-wall pipe 81 and by way of the front portion center hole 79. The low-pressure lubricating oil flowing towards the needle bearing 63 for the second gear position driven gear 61 is supplied from the side of the front crankcase 25 through the oil passage between the front portion counter shaft 9a and the outer pipe 81a. The low-pressure lubricating oil supplied towards the needle bearing 64 for the third gear position driven gear 62 is supplied from the side of the rear crankcase cover 27 through the rear portion center hole 80. In the present embodiment, the steel ball is pressed into the narrowest portion of the center hole in each rotary shaft to partition the center hole into the front portion center hole and the rear portion center hole, thereby separating the oils that are different in pressure from each other and utilizing the center holes as passages for supplying the oils. Therefore, the oils can be supplied effectively with a simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil passage structure in a rotary shaft, comprising:
   a first oil passage having oil under a first predetermined pressure being disposed within, said first oil passage extending from a first end of said rotary shaft; and
   a second oil passage having oil under a second predetermined pressure that is different relative to said first predetermined pressure, said second oil passage extending from a distal end of said rotary shaft;
   wherein said first and second oil passages are in communication with each other through a communication passage that is smaller relative to diameters of said first and second oil passages and said smaller-diameter communication passage is closed by pressing a ball therein.

2. The oil passage structure in a rotary shaft according to claim 1, wherein said first oil passage has a first predetermined diameter that is drilled into the first end of said rotary shaft.

3. The oil passage structure in a rotary shaft according to claim 1, wherein said second oil passage has a second predetermined diameter that is drilled into the distal end of said rotary shaft.

4. The oil passage structure in a rotary shaft according to claim 2, wherein said communication passage has the smaller diameter relative to said first predetermined diameter, said communication passage being drilled said rotary shaft.

5. The oil passage structure in a rotary shaft according to claim 3, wherein said communication passage has the smaller diameter relative to said second predetermined diameter, said communication passage being drilled said rotary shaft.

6. The oil passage structure in a rotary shaft according to claim 1, wherein said first oil passage includes oil being at a high-pressure for operating a clutch.

7. The oil passage structure in a rotary shaft according to claim 1, wherein said second oil passage includes oil being at a low-pressure for providing lubrication to a bearing.

8. The oil passage structure in a rotary shaft according to claim 4, wherein said first and second oil passages and said communication passage extend through the rotary shaft for readily enabling the removal of burrs formed therein.

9. An oil passage structure in a rotary shaft, comprising:
a first oil passage extending from a first end of said rotary shaft;
a second oil passage extending from a distal end of said rotary shaft;
a communication passage for connecting said first and second oil passages relative to each other; and
a closure member for closing said communication passage,
wherein a diameter of the closure member is smaller than diameters of both the first and the second oil passages.

10. The oil passage structure in a rotary shaft according to claim 9, wherein said first oil passage has a first predetermined diameter that is drilled into the first end of said rotary shaft.

11. The oil passage structure in a rotary shaft according to claim 9, wherein said second oil passage has a second predetermined diameter that is drilled into the distal end of said rotary shaft.

12. The oil passage structure in a rotary shaft according to claim 10, wherein said communication passage has a smaller diameter relative to said first predetermined diameter, said communication passage being drilled said rotary shaft.

13. The oil passage structure in a rotary shaft according to claim 11, wherein said communication passage has a smaller diameter relative to said second predetermined diameter, said communication passage being drilled said rotary shaft.

14. The oil passage structure in a rotary shaft according to claim 9, wherein said first oil passage includes oil being at a high-pressure for operating a clutch.

15. The oil passage structure in a rotary shaft according to claim 9, wherein said second oil passage includes oil being at a low-pressure for providing lubrication to a bearing.

16. The oil passage structure in a rotary shaft according to claim 12, wherein said first and second oil passages and said communication passage extend through the rotary shaft for readily enabling the removal of burrs formed therein.

17. The oil passage structure in a rotary shaft according to claim 9, wherein said closure member is a ball.

18. The oil passage structure in a rotary shaft according to claim 17, wherein said closure member is a steel ball.

19. An oil passage structure in a rotary shaft, comprising:
a first oil passage extending from a first end of said rotary shaft;
a second oil passage extending from a distal end of said rotary shaft;
a communication passage for connecting said first and second oil passages relative to each other; and
a closure member for closing said communication passage,
wherein said first oil passage includes oil being at a high-pressure for operating a clutch.

* * * * *